United States Patent
Rumsey

(10) Patent No.: US 9,772,930 B2
(45) Date of Patent: Sep. 26, 2017

(54) TECHNIQUES FOR EVALUATING APPLICATIONS THROUGH USE OF AN AUXILIARY APPLICATION

(71) Applicant: Adobe Systems Incorporated, San Jose, CA (US)

(72) Inventor: Anthony Robert Rumsey, Kanata (CA)

(73) Assignee: Adobe Systems Incorporated, San Jose, CA (US)

( * ) Notice: Subject to any disclaimer, the term of this patent is extended or adjusted under 35 U.S.C. 154(b) by 63 days.

(21) Appl. No.: 14/745,846

(22) Filed: Jun. 22, 2015

(65) Prior Publication Data
US 2016/0371172 A1 Dec. 22, 2016

(51) Int. Cl.
- *G06F 9/44* (2006.01)
- *G06F 11/36* (2006.01)
- *G06F 9/445* (2006.01)
- *G06F 3/0488* (2013.01)

(52) U.S. Cl.
CPC ........ *G06F 11/3664* (2013.01); *G06F 3/0488* (2013.01); *G06F 8/65* (2013.01); *G06F 8/38* (2013.01)

(58) Field of Classification Search
CPC .... G06F 11/3664–11/3668; G06F 8/38; G06F 8/65; G06F 3/0488
See application file for complete search history.

(56) References Cited

U.S. PATENT DOCUMENTS

| | | | | |
|---|---|---|---|---|
| 7,827,495 | B2 * | 11/2010 | Bells | G06F 8/38 715/744 |
| 8,589,140 | B1 * | 11/2013 | Poulin | G06F 11/3457 463/42 |
| 8,719,001 | B1 * | 5/2014 | Izdepski | G06F 8/61 703/22 |
| 8,856,748 | B1 * | 10/2014 | Larsen | G06F 11/3668 717/125 |
| 9,154,611 | B1 * | 10/2015 | Jackson | H04L 41/0253 |

(Continued)

OTHER PUBLICATIONS

Raghavan N. Srinivas, Java Web Start to the rescue: Find out how Java Web Start aids client-side deployment, [Online] Jul. 6, 2001, [Retrieved from the Internet] <http://www.javaworld.com/article/2075391/core-java/java-web-start-to-the-rescue.html> 8 pages.*

(Continued)

*Primary Examiner* — Ziaul A Chowdhury
(74) *Attorney, Agent, or Firm* — Kilpatrick Townsend & Stockton LLP

(57) ABSTRACT

Disclosed are various embodiments for evaluating an application under development through use of a viewer application executing in a computer. The computer retrieves an application package comprising code for a target application to be evaluated in the computer. The code for the target application is stored in a memory of the computer accessible to the viewer application. The code for the target application is stored without installing the target application as a stand-alone application on the computer. Code of the viewer application is executed in order to execute the stored code for the target application for evaluation. Executing the stored code of the target application executes the target application within the execution of the viewer application.

17 Claims, 8 Drawing Sheets

(56) References Cited

U.S. PATENT DOCUMENTS

| | | | | |
|---|---|---|---|---|
| 9,189,378 B1* | 11/2015 | Ryan | ............ | G06F 11/3664 |
| 2003/0050087 A1* | 3/2003 | Kwon | ............ | G06F 8/65 |
| | | | | 455/550.1 |
| 2004/0027326 A1* | 2/2004 | Hays | ............ | G06F 8/38 |
| | | | | 345/106 |
| 2005/0223363 A1* | 10/2005 | Black-Ziegelbein | | |
| | | | ............ | G06F 11/3624 |
| | | | | 717/127 |
| 2007/0250819 A1* | 10/2007 | Fjeldstad | ............ | G06F 11/3664 |
| | | | | 717/129 |
| 2008/0028395 A1* | 1/2008 | Motta | ............ | G06F 8/65 |
| | | | | 717/177 |
| 2012/0284622 A1* | 11/2012 | Avery | ............ | G06F 3/0488 |
| | | | | 715/719 |
| 2013/0318498 A1* | 11/2013 | Mittal | ............ | G06F 11/366 |
| | | | | 717/124 |
| 2013/0346923 A1* | 12/2013 | Ku | ............ | G06F 3/04842 |
| | | | | 715/835 |
| 2014/0033188 A1* | 1/2014 | Beavers | ............ | G06F 8/65 |
| | | | | 717/170 |
| 2014/0196013 A1* | 7/2014 | Orr | ............ | G06F 11/3664 |
| | | | | 717/125 |
| 2015/0052503 A1* | 2/2015 | Ligman | ............ | G06F 11/3664 |
| | | | | 717/125 |
| 2015/0370427 A1* | 12/2015 | Zhang | ............ | G06F 3/0488 |
| | | | | 715/835 |
| 2016/0092348 A1* | 3/2016 | Straub | ............ | G06F 11/3684 |
| | | | | 717/124 |

OTHER PUBLICATIONS

Mohsen Anvaari et al., "Evaluating Architectural Openness in Mobile Software Platforms", [Online], 2010, pp. 1-8, [Retrieved from Internet on Apr. 30, 2017], <https://pdfs.semanticscholar.org/9775/161628598231506dbdd6d6ffa5753ab6c684.pdf>.*

D. Raychaudhuri et al., "Overview of the ORBIT Radio Grid Testbed for Evaluation of Next-Generation Wireless Network Protocols", [Online], 2016, pp. 1664-1669, [Retrieved from Interenet on Apr. 30, 2017], <http://citeseerx.ist.psu.edu/viewdoc/download?doi=10.1.1.938.2368&rep=rep1&type=pdf>.*

Angel R. Puerta et al., "Mobile: User-Centered Interface Building", [Online], 1999, pp. 426-433, [Retrieved from Internet on Apr. 30, 2017], <http://delivery.acm.org/10.1145/310000/303124/p426-puerta.pdf>.*

EEva Kangas et al., "Applying User-Centered Design to Mobile Application Development", [Online], 2005, pp. 55-59, [Retrieved from Internet on Apr. 30, 2017], <http://delivery.acm.org/10.1145/1080000/1070866/p55-kangas.pdf>.*

* cited by examiner

TECHNIQUES FOR EVALUATING APPLICATIONS THROUGH USE OF AN AUXILIARY APPLICATION

FIELD

This disclosure relates generally to computer-implemented methods and systems and more particularly relates to evaluating an application under development through use of a viewer application executing in a computing device.

BACKGROUND

Given the proliferation of mobile devices and other types of computing devices, many people have been encouraged to develop applications for these computing devices. Some of these people may be experienced application developers, while others are new to the different routines required to not only author an application, but to also build and test the application. Development environments are available that simplify the application development process, but building and testing an application for different types of computing devices and with different operating systems can still be a complicated, time-consuming process.

SUMMARY

Disclosed are various embodiments for evaluating an application under development through use of a viewer application executing in a mobile device. The viewer application retrieves an application package that comprises code for the target application. In some implementations, the package is retrieved from a content management system (CMS). In other implementations, the package can be retrieved, if it exists, from local storage in the mobile device.

The viewer application stores the code for the target application in a memory of the mobile device that is accessible to the viewer application. In some implementations, the viewer application adds the code for the target application to the memory by replacing at least a portion of the code of the viewer application in a memory of the mobile device with the code for the target application. In various implementations, the code for the target application is modified to include supplementary code with a reference to code for the viewer application. In some implementations, an update server defined in the code for the target application is modified to use the CMS as the update server. In other implementations, supplementary code is added to the target application for retrieving an updated version of the target application and initiating execution of the updated version of the target application. In still other implementations, supplementary code is added to the target application for capturing one or more screenshots of a user interface of the target application during execution.

The viewer application executes the stored code for the target application for evaluation. Executing the stored code of the target application executes the target application within the execution of the viewer application. In further implementations, the target application monitors for input corresponding to a request to return to execution of the viewer application, including the user interface, via the reference. In some implementations, the input is selection of an item from a supplementary menu. In other implementations, the input is a gesture received via a touch-sensitive display.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
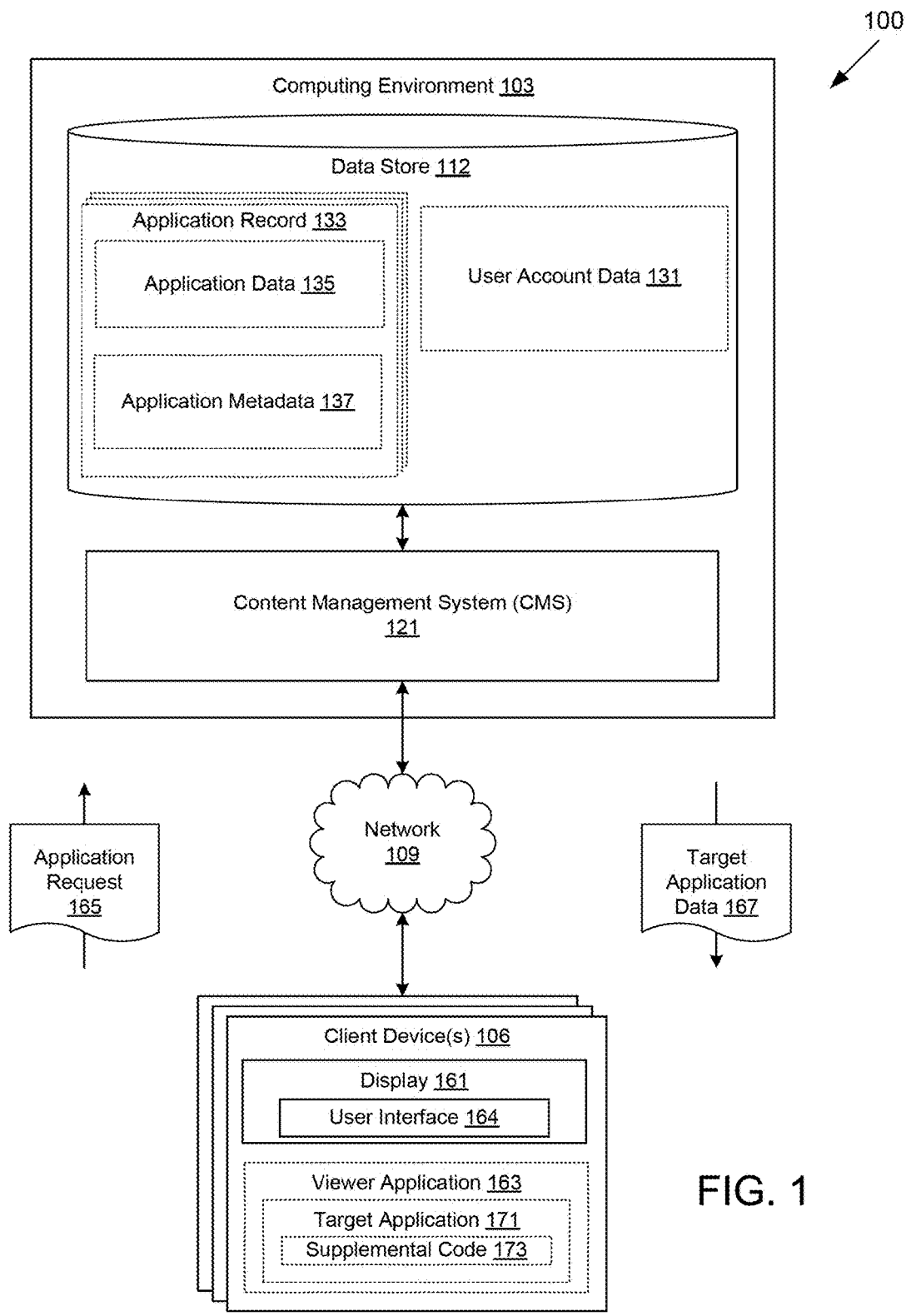
FIG. 1 is a drawing of a networked environment according to various embodiments of the present disclosure.

Disclosed herein are techniques for simplifying the operations used to test and evaluate an application under development through use of a viewer application executing in a computing device. Traditionally, evaluating an application that is under development for computing devices, such as smartphones, required developers or other users to complete complex procedures to compile the application for the correct hardware and operating system, deploy the application, and install the application as a stand-alone application. Moreover, these procedures would be required for each individual application that a user wishes to evaluate and possibly for each type of device in which the application is to be evaluated.

In terms of the procedures involved to evaluate an application in a given computing device, it would be significantly less complex for users to have a general, existing application (i.e. the viewer application) installed in the computing device that could execute the code of any application selected for evaluation (i.e. the "target application") without undergoing the various compilation and installation procedures for the target application as a stand-alone application. To this end, using techniques disclosed herein, the viewer application executing in a computing device acquires code for the target application, places the code for the target application in the memory, and initiates execution of the code for the target application that is located in the memory.

As a result, the user is able to evaluate the target application in the particular computing device (possibly one computing device among many different types in which the application should be tested) without the complex and error-prone compilation and installation procedures for the target application as a stand-alone application. Furthermore, the viewer application is generalized such that it is capable of initiating execution of code for other applications under development in the same manner as performed for the current target application. In the following discussion, a general description of the system and its components is provided, followed by a discussion of the operation of the same.

As used herein, the "target application" is an application that has been selected for evaluation in a client device by a user.

As used herein, the "viewer application" is an application executed in a client device that facilitates the evaluation of one or more target applications in the client device by a user.

As used herein, the "content management system" (CMS) is a network-enabled service that allows users to manage the creation, editing, and deletion of content supporting development of applications (or simply "apps") that are executable in one or more computing devices. In addition, the CMS can support features allowing users to collaborate with other users during the application development process, as well as authentication and authorization capabilities to manage access to the content among the various users.

With reference to FIG. 1, shown is a networked environment 100 according to various embodiments. The networked environment 100 includes a computing environment 103 and one or more client devices 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks can comprise cellular networks, satellite networks, cable networks, Ethernet networks, and/or other types of networks.

The computing environment 103 comprises, for example, a server computer or any other system providing computing capability. Alternatively, the computing environment 103 employs a plurality of computing devices arranged, for example, in one or more server banks or computer banks or other arrangements. Such computing devices can be located in a single installation or distributed among many different geographical locations. For example, in some embodiments, the computing environment 103 includes a plurality of computing devices that together comprise a hosted computing resource, a grid computing resource, and/or any other distributed computing arrangement. In some cases, the computing environment 103 corresponds to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 can represent a plurality of data stores 112, as can be appreciated. The data stored in the data store 112, for example, is associated with the operation of the various applications and/or functional entities described below.

The components executed on the computing environment 103, for example, include a content management system (CMS) 121 and other applications, services, processes, systems, engines, or functionality not discussed in detail herein. The CMS 121 is executed to allow users to manage the creation, editing, and deletion of content supporting development of applications (or simply "apps") that are executable in one or more computing devices, such as in a client device 106. Among other features, the CMS 121 can support the use of credentials with which to authenticate users, managing user permissions of various files and other data for development projects, version history for the development data, version publication and release information for development projects, and/or other possible features as can be appreciated.

The data stored in the data store 112 includes, for example, user account data 131, application records 133, and potentially other data. The user account data 131 includes credentials for user accounts associated with the CMS 121, user preferences, a history of interactions with the CMS 121 by the users, user permissions associated with applications and development projects, and/or other possible data. The applications records 133 each include various content and metadata associated with development of an application. The application records 133 are each associated with application data 135, application metadata 137, and possibly other data. The application data 135 includes content associated with development of a particular application, such as source and executable code for the application, text strings, audio, video, images, and/or other types of content as can be appreciated. The application metadata 137 include various metadata associated with a particular application such as a description, keywords, version history, indicators for versions published or released, build instructions for various different computing devices, network address from which released applications can be updated, change logs, release notes, identifiers for the application owner(s)/contributor(s), and/or other possible metadata.

The client 106 is representative of a plurality of client devices that can be coupled to the network 109. The client 106 comprises, for example, a processor-based system such as a computer system. Such a computer system may be embodied in the form of a smartphone, a desktop computer, a laptop computer, a personal digital assistant (PDA), a cellular telephone, a set-top box, a music player, a web pad, a tablet computer system, a game console, an electronic book reader, or other devices with like capability. The client 106 may include a display 161. The display 161 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. In some embodiments, the display 161 is touch-sensitive and can support various gesture-based forms of input.

The client 106 may be configured to execute various applications such as a viewer application 163 and/or other applications. The viewer application 163 is executed in a client 106, for example, to access content served up by the computing environment 103 and/or other servers, thereby rendering a user interface 164 on the display 161. To this end, the viewer application 163 may comprise, for example, a browser, a dedicated application, etc., and the user interface 164 may comprise a network page, an application screen, etc. Included among the various types of content accessible by viewer application 163, are the applications under development that are managed by the CMS 121. Selected applications (also referred to as "target applications") can be requested and received via an application request 165 and target application data 167, respectively.

The target application 171 can be extracted from the target application data 167 and prepared for execution by the viewer application 163. The preparation process may include the addition and/or modification of supplementary code 173 to the target application 171, as is described in greater detail herein. The client 106 can also be configured to execute applications beyond the viewer application 163 such as, for example, email applications, social networking applications, word processors, spreadsheets, and/or other applications.

Next, a general description of the operation of the various components of the networked environment 100 is provided. To begin, an application developer or other user who is to test an application being developed, establishes a communication session between the viewer application 163 and the CMS 121. The communication session may be carried out using various protocols such as, for example, hypertext transfer protocol (HTTP), simple object access protocol (SOAP), representational state transfer (REST), user datagram protocol (UDP), transmission control protocol (TCP), and/or other protocols for communicating data over the network 109. In some implementations, the user is authenticated to the CMS 121 using one or more user credentials.

Figure 2:
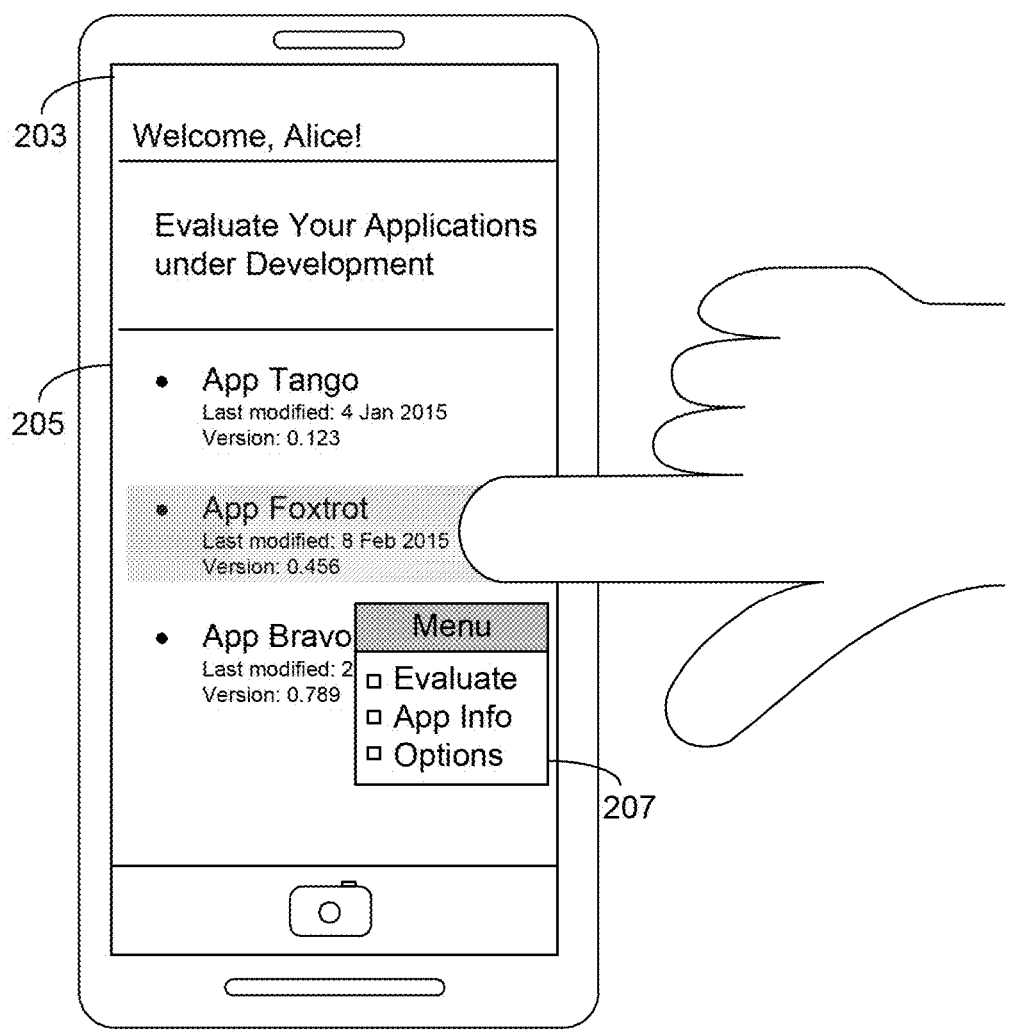
FIGS. 2-4 are pictorial diagrams of exemplary user interfaces rendered by a client in the networked environment of FIG. 1 according to various embodiments of the present disclosure.

Thereafter, the user is presented with a user interface 164 for the viewer application 163, such as shown in FIG. 2. Among the various possible screens of the user interface 164 is the application selection screen 203 in which a user is shown a list received from the CMS 121 that includes any applications which can be evaluated through the viewer application 163. In some implementations, the application selection screen 203 also includes applications stored locally on the client 106 which can be evaluated through the viewer application 163. The list of applications, such as the three applications shown in the application panel 205, can also include names, version information, modification dates, and/or other possible metadata not shown, such as icons, screenshots, keywords, description, etc. In some embodiments, the application panel 205 also includes a menu 207, such as a pop-up menu, through which various information and settings associated with the applications and the viewer app can be found. For example, the menu can allow the user to initiate evaluation of a selected application, find additional information about an application (e.g. application size, description, etc.), options or other user preferences for the viewer application 163 (e.g. user credentials, CMS server address, etc.), and/or other possibilities.

Once the user has provided input selecting an application to evaluate (i.e. the "target application"), the viewer application 163 transmits an application request 165 to the CMS 121 via the network 109. The application request 165 can comprise an identifier for the target application to be evaluated, descriptors and version information for the viewer application 163 and client 106 in which the target application is to be executed for evaluation, and/or other possible information. In response to the application request 165, the CMS 121 transmits the target application data 167 to the requesting viewer application 163. As described previously, in some embodiments, the target application data 167 may be cached and stored locally on the client 106 or another storage device, instead of retrieving it from the CMS 121. The target application data 167 comprises content, including both executable code and static content, needed to execute the target application 171 from the viewer application 163. As can be appreciated, execution of the target application 171 can further utilize plug-ins or other code that pre-exists on the client 106 and/or is retrieved separately. In some embodiments, the target application data 167 comprises an application package, such as an APK (Android Application Package), ZIP, etc., that includes the content for the target application, as well as a manifest and/or other metadata instructing how the application is to be executed from the content, such as can be used to accommodate the differences among the various types of clients 106 and/or operating systems of each client 106. Changes or modifications to the content of the target application made by the viewer application 163 are made to the local copy of the content held in the memory and storage space of the client 106 that are allocated to the viewer application 163.

In other embodiments, the target application provides, when executing, a feature to check for updates to the target application and allowing an end-user to update the application if such an update exists. To carry out this feature, the target application is configured with a network address, such as a uniform resource identifier (URI), of an update server at which to check for published updates to the target application, where the update server may not be controlled by the developer of the target application. In order to evaluate the "application update" or "in-app update" feature of the target application prior to the release of the target application or with a development version of the target application, the viewer application 163 can modify the network address information of the update server in the local copy of the code of the target application. For example, the network address of the CMS 121 can be inserted as the update server. Thereafter, during execution of the target application 171 in the client 106, the application update feature will instead check with the CMS 121 for more recent versions (i.e. developmental, pre-release versions) of the target application instead of the previously defined update server.

In order to execute the target application 171 in the client device 106, the viewer application 163 stores the content, including executable code, of the target application 171 in the memory of the client 106. In some embodiments, when the viewer application 163 adds the content of the target application 171 to memory, the viewer application 163 replaces a portion of its own content in the memory. As a result, the target application 171 can begin executing in the client 106 as if the target application had been compiled and installed in the client through a traditional application install routine.

In some implementations, the viewer application 163 initiates target applications 171 built using web content technology, such as HTML and JavaScript/CSS (cascading style sheets), whereby the viewer application 163 contains a web view user interface that takes up the full width and height on the display 161 of the client 106. Once the application package for the target application 171 has been obtained and unpackaged by the client 106, the viewer application 163 examines the metadata of the target application to determine the root HTML document for the target application. The viewer application 163 then initiates execution of the target application 171 by redirecting the content viewer providing the web view user interface of the viewer application to load the root HTML document for the target application 171. This root HTML document of the target application 171 will then take care of requesting any other local assets that are needed, which may have been included as part of the application package (e.g. scripts, fonts, images, styles, etc.) and/or are available elsewhere on the client device 106.

In various embodiments, a copy of code for the viewer application 163 is also stored in a separate location on the client 106 (e.g. in flash storage or other non-volatile storage, another location in memory, etc.) from the location in which it was executing in memory. In this manner, code for the viewer application still exists on the client 106 and can be initiated for execution if portions of the code of the viewer application 163 in memory are replaced with the target application 171.

Figure 3:
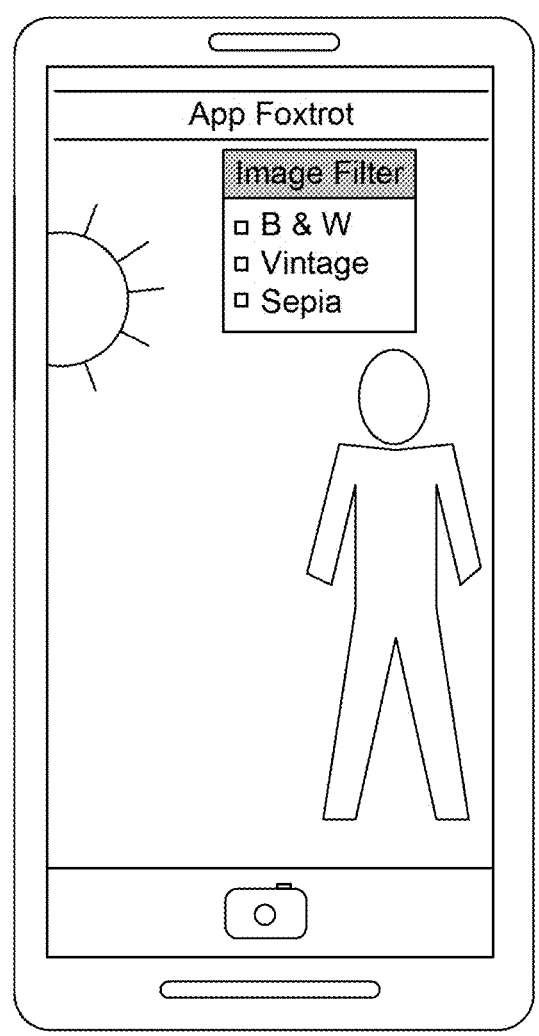

For example, the target application 171 previously selected for evaluation by the user through the viewer application 163 is "App Foxtrot," an exemplary image editing application. As shown in FIG. 3, the content of App Foxtrot has now been placed in memory and is being executed such that the viewer application 163, or at least the user interface for the viewer application 163, is no longer executing.

Thus, without further modifications, in order for a user evaluating the target application 171 to return to the user interface for the viewer application 163, the user would need to leave the target application 171 and re-start the viewer application 163. Therefore, in some embodiments, to simplify the user interactions required to switch from execution of the target application 171 back to the user interface of the viewer application 163, the viewer application 163 modifies the local copy of the code of the target application to insert supplementary code 173 that allows the user to, among other possible functions, "revert" to the user interface of the viewer application 163 from within the target application 171. To this end, the viewer application 163 can insert supplementary code 173 into the target application 171, where the supplementary code 173 contains a pointer or other type of reference back to the code for the user interface of the viewer application 163 in local storage and/or elsewhere in memory on the client 106. Therefore, when executed as part of the execution of the target application 171, the supplementary code 173 can activate the reference to begin executing code for the user interface of the viewer application 163 specified by the reference based on a gesture entered by the user, selection of an item from a menu, and/or elsewhere through the user interface of the target application 171.

Figure 4:
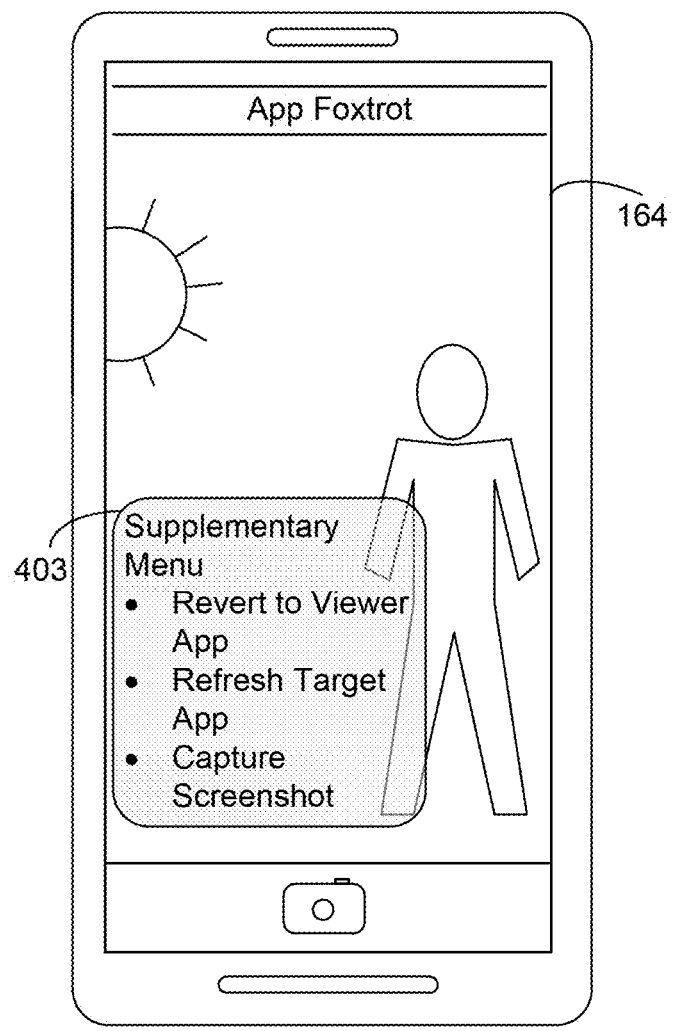

For example, as shown in FIG. 4, the App Foxtrot (i.e. the target application), now executing in the client 106, has been previously modified by the viewer application 163 to include supplementary code 173 that includes a reference back to the code for the user interface of the viewer application stored in a location accessible to the client 106. In this instance, the supplementary code 173 provides a supplementary menu 403 triggered by a particular gesture or other input received from a user. From the supplementary menu 403, the user can select one or more items from the menu, such as "Revert to Viewer App," which activates the reference to initiate executing code for the user interface of the viewer application 163 instead of App Foxtrot. In some embodiments, the state of the viewer application 163 is preserved in memory from prior to beginning execution of the target application 171. In other embodiments, code for the viewer application 163 is re-initialized from the separate location, and the state from just prior to beginning execution of the target application 171 is not preserved.

The supplementary code 173 can include code for other features which can be added to the target application 171, instead of or in addition to the feature described above to revert to the viewer application. In various embodiments, the viewer application 163 adds supplementary code 173 to a target application 171 to "refresh" the target application. In these embodiments, when activated, the code added to the target application 171 retrieves a new copy of the target application from the CMS 121 and begins executing this new copy of the target application 171 without the user having to first revert to the viewer application, then manually retrieve a new copy. The supplementary code 173 used to refresh the target application can be configured to get the latest version of the target application on the CMS 121, the same version of the target application currently being executed, do nothing unless a newer version of the target application is available on the CMS 121, and/or other possibilities as can be appreciated. As discussed previously, while some types of target applications can support in-app updates using an upgrade server, not all target applications do. Moreover, even for applications that do support in-app updates, users may wish to simply update the target application without configuring and testing the in-app update feature.

In still other embodiments, the viewer application 163 adds supplementary code 173 to a target application 171 to capture one or more screenshots. In these embodiments, when activated, the code added to the target application 171 captures a screenshot of the user interface 164 of the target application 171 during execution. The screenshot may be captured in various possible still image and/or video formats, such as JPEG (Joint Photographic Experts Group), BMP (bitmap), GIF (Graphics Interchange Format), MPEG 1/2/4 (Moving Picture Experts Group), etc. In addition, the screenshot feature can support transmitting the screenshot images that were captured from the client 106 to the CMS 121. As can be appreciated, while the supplementary menu 403 can be used to initiate the various features available in supplementary code 173, each of the feature can be initiated directly from user input through the user interface instead of or in addition to the supplementary menu 403. For example, a three-finger touch gesture initiates a reversion to the viewer app, a circle touch gesture initiates a screenshot capture, and a triangle gesture initiates a refresh of the target app.

Figure 5:
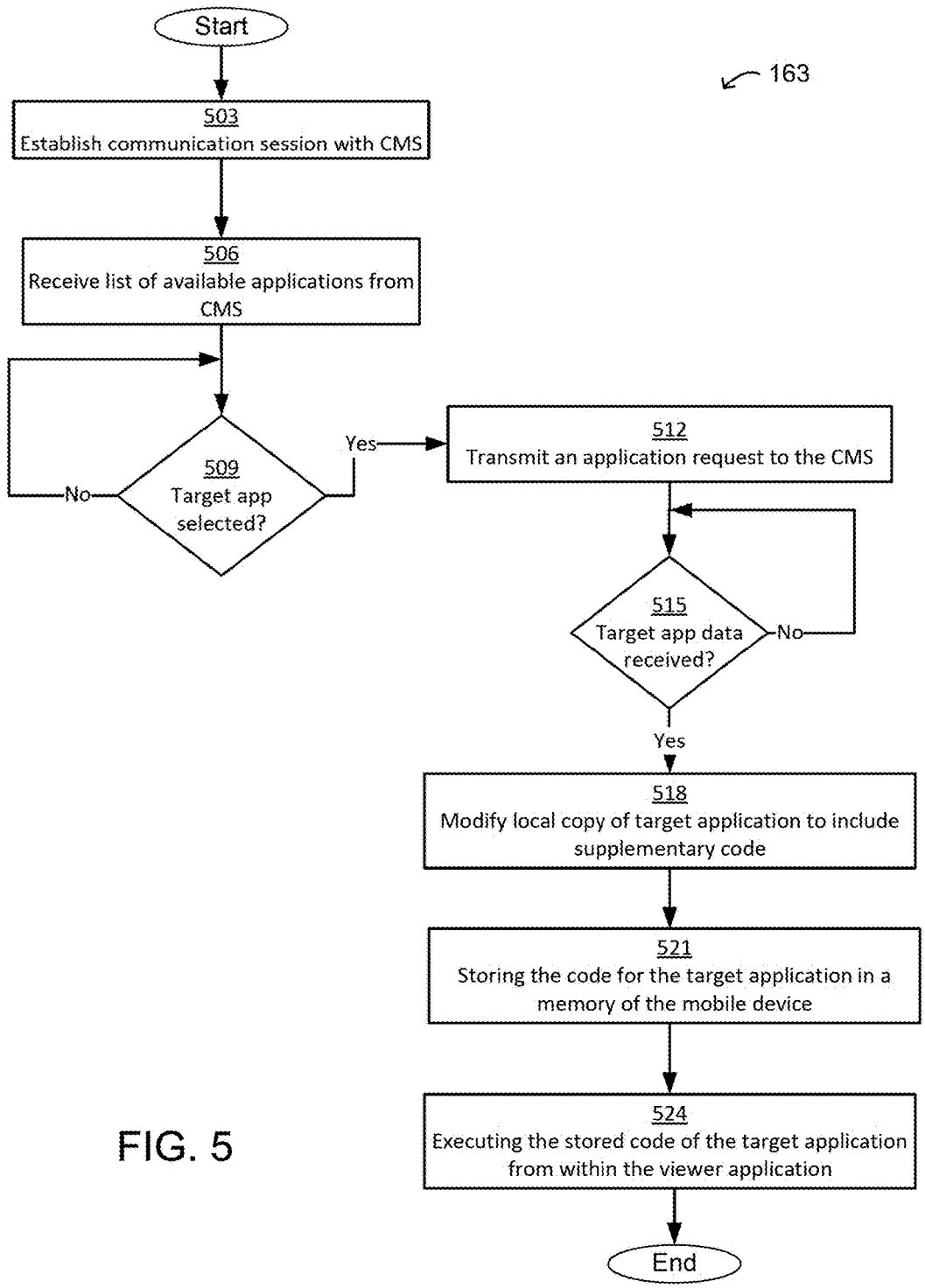
FIG. 5 is a flowchart illustrating one example of functionality for executing a target application within a viewer application after obtaining the target application from a content management system and modifying the target application to include supplementary code, where the functionality is implemented as portions of a viewer application executed in a client in the networked environment of FIG. 1 according to various embodiments of the present disclosure.
Figure 6:
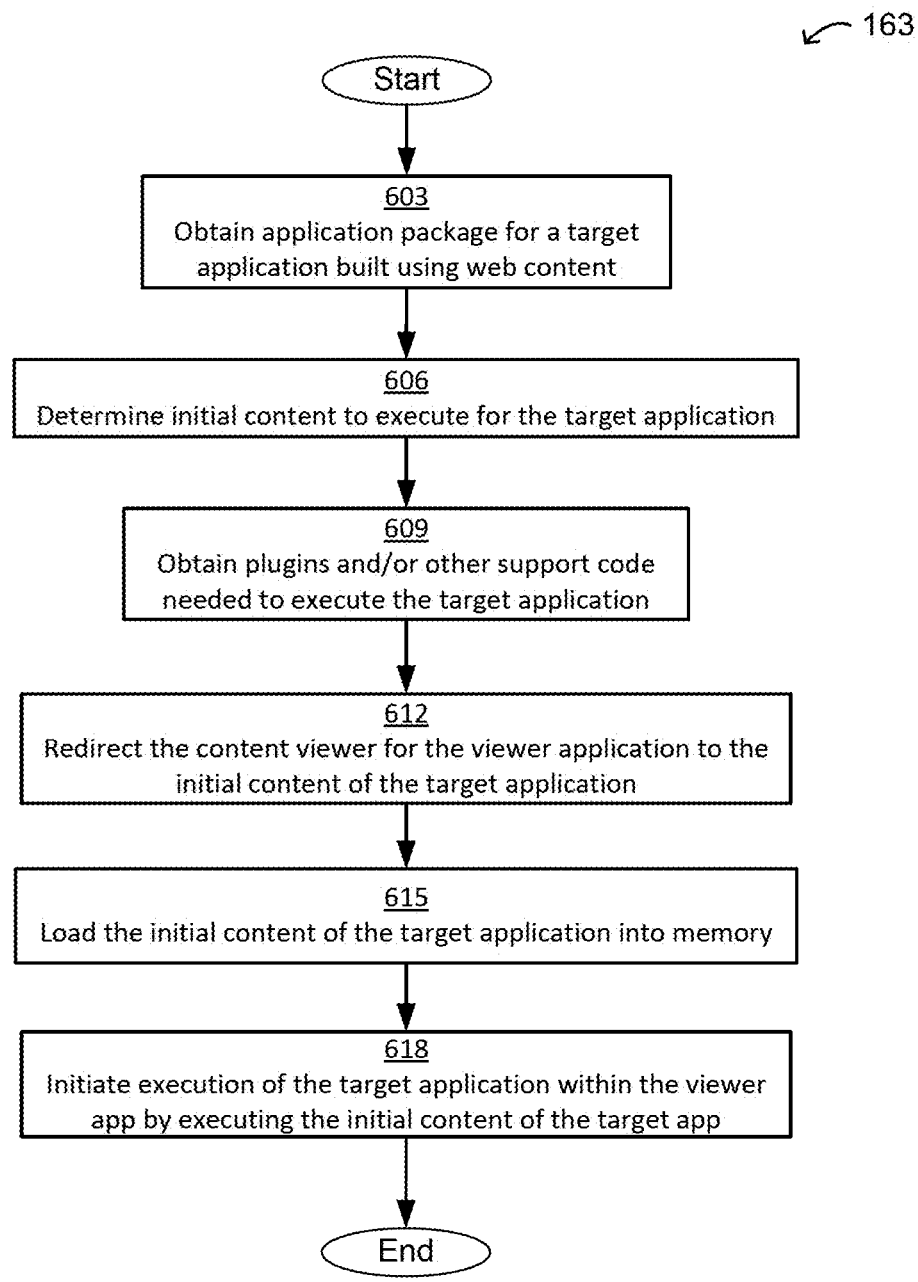
FIG. 6 is a flowchart illustrating an example of functionality for executing a target application within a viewer application, where the target application is built using web technology, and the functionality is implemented as portions of a viewer application executed in a client in the networked environment of FIG. 1 according to various embodiments of the present disclosure.
Figure 7:
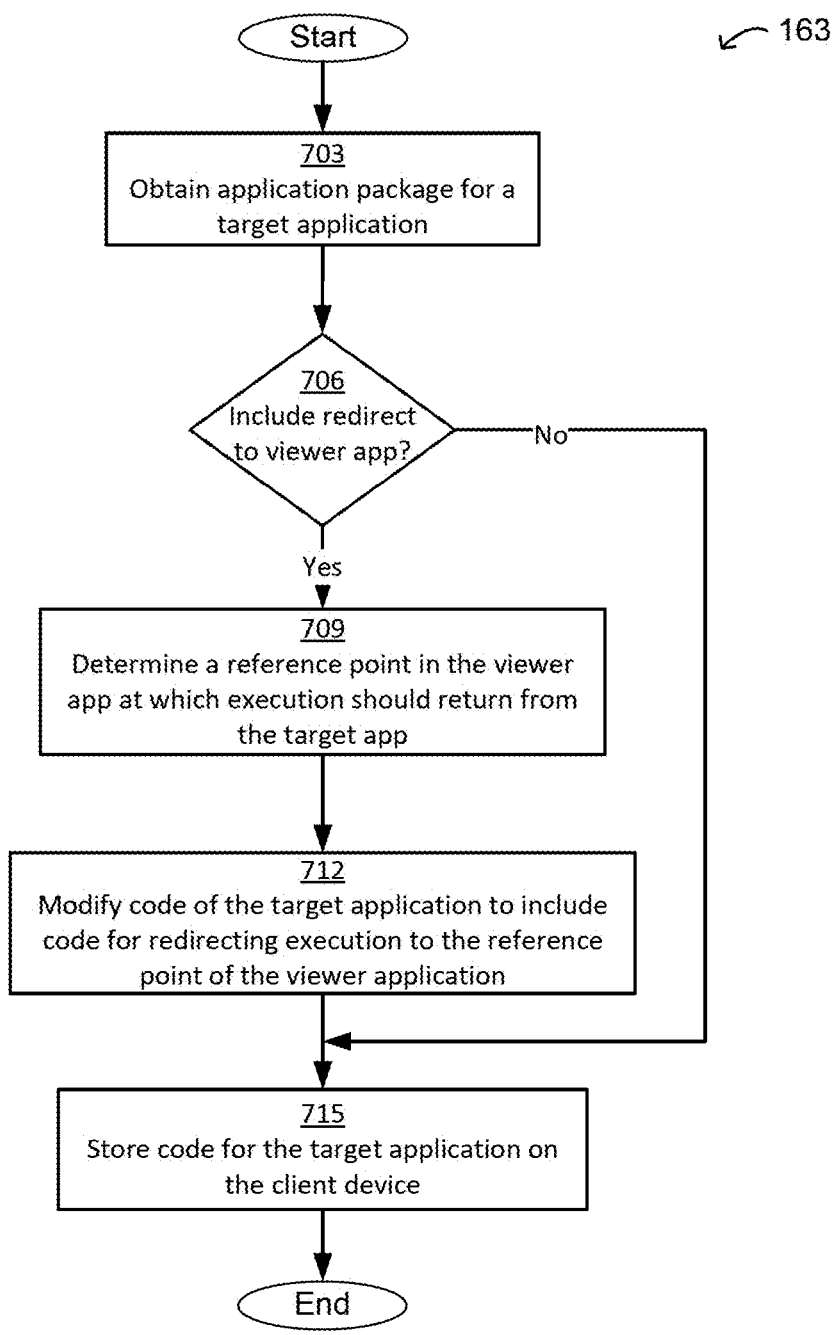
FIG. 7 is a flowchart illustrating an example of functionality for modifying code of a target application to include supplementary code for reverting back to the viewer application during execution of the target application, where the functionality is implemented as portions of a viewer application executed in a client in the networked environment of FIG. 1 according to various embodiments of the present disclosure.

Referring next to FIGS. 5-7, shown are flowcharts that each provide one example of the operation of a portion of the viewer application 163 according to various embodiments. It is understood that each of the flowcharts of FIGS. 5-7 provides merely an example of the many different types of functional arrangements that may be employed to implement the operation of the portion of the viewer application 163 as described herein. As an alternative, each of the flowcharts of FIGS. 5-7 may be viewed as depicting an example of elements of a method implemented in the client 106 according to one or more embodiments.

FIG. 5 is a flow chart illustrating functionality for executing a target application within a viewer application after obtaining the target application from a content management system and modifying the target application to include supplementary code, where the functionality is implemented as portions of a viewer application 163 executed in a client 106. The operation of the viewer application 163 described in FIG. 5 may be executed in response to a user initiating execution of the viewer application 163 on the client device 106. Beginning with block 503, an application developer or other user who is to test an application under being developed, establishes a communication session between the viewer application 163 and the CMS 121. The communication session may be carried out using various protocols such as, for example, HTTP, SOAP, REST, UDP, TCP, and/or other protocols for communicating data over the network 109. In some implementations, the user is authenticated to the CMS 121 using one or more user credentials.

Next, in block 506, the viewer application 163 receives a list from the CMS 121 that includes applications which can be evaluated by the user through the viewer application 163. The list of applications can also include names, version information, modification dates, icons, screenshots, keywords, description, and/or other possible metadata associated with the applications. The list of applications is presented to the user via a user interface from which the user can select a target application for evaluation.

Then, in block 509, the user application determines whether the user has received input selecting an application for evaluation. If the user has not made a selection, execution of the viewer application returns to 509. Alternatively, if a user has selected a target application, in block 512, the viewer application 163 transmits an application request 165 to the CMS 121 via the network 109. The application request 165 can comprise an identifier for the target application to be evaluated, descriptors and version information for the viewer application 163 and client 106 in which the target application is to be executed for evaluation, and/or other possible information.

Subsequently, in block 515, the viewer application determines whether target application data 167 has been received in response to the application request. If the target application data 167 has not yet been received, execution of the viewer application 163 returns to block 515. Alternatively, if the target application data 167 has been received, in block 518, the viewer application 163 can modify the content of the received target application to include any supplementary code, including changes to existing code of the target application. For example, the supplementary code can include changes to the network address of a network server used for in-app updates, code with a reference to resume execution of the viewer application 163, including the user interface, from within the target application 171 (i.e. "revert to viewer app"), code to initiate a refresh of the target application 171, code to capture screenshots of the target application, and/or other possible changes to the code or content of the local copy of the target application 171.

Next, in block 521, the viewer application 163 stores content, including executable code, of the target application 171 in memory. Then, in block 524, the viewer application 163 executes the stored code of the target application 171 in the client 106. At this point, execution of the viewer application 163, or at least the user interface of the viewer application 163, ceases with the start of execution of the target application 171, including any supplementary code 173.

As discussed above, in some embodiments, execution of the viewer application, including the user interface, can resume by the user providing input initiating the "revert to viewer app" feature of the supplementary code 173. In these embodiments, code for the viewer application still exists on the client 106 (e.g. in flash storage or other non-volatile storage, another location in memory, etc.) and can be initiated for execution after execution of the target application 171 has begun.

FIG. 6 is a flow chart illustrating functionality for executing a target application within a viewer application, where the target application is built using web technology and the functionality is implemented as portions of a viewer application 163 executed in a client 106. The operation of the viewer application 163 described in FIG. 6 is executed in response to a user selecting a target application 171 for evaluation in the viewer application 163 on the client device 106. The application package for the target application can be resident in local storage on the client 106 or be retrieved from a server, such as a CMS, via a network. Beginning with block 603, the viewer application 163 obtains an application package for a target application 171 built using web content, such as HTML, XML (extensible markup language), JavaScript/CSS, and/or other web technologies. The application package can be in a ZIP, RAR, BZIP, APK, or other file packaging formats.

Next, in block 606, the viewer application 163 examines the metadata for the target application 171 provided in the application package to determine the initial content to execute for the target application. In some implementations, the initial content is determinable by the viewer application 163 based upon an examination of the content of the target application 171. For example, if the target application is built using HTML with JavaScript/CSS, the initial content would be the root HTML document. Then, in block 609, the viewer application 163 obtains any plug-ins or additional code that is needed by the client 106 to support execution of the target application 171. For example, a plug-in could be used to provide playback of video for the target application.

Continuing, in block 612, the viewer application 163 instructs the content viewer that provides the web view user interface for the viewer application to redirect to the initial content determined for the target application 171. In one embodiment, the content viewer is a rendering engine for various web content present in the viewer application 163 and various possible target applications. Next, in block 615, the content viewer for the viewer application 163 loads at least the initial content for the target application 171 into the memory of the client 106.

In one embodiment, the content for the target application 171 replaces at least a portion of the viewer application 163, such as a portion of the content for the user interface of the viewer application. Replacing at least a portion of the code of the viewer application 163 with code of the target application 171 provides an advantage with regard to a reduction in the amount of memory resources of the client 106 consumed to execute the target application, among other possible advantages. In another embodiment, the content for the target application 171 is added to the memory without replacing any of the viewer application 163. This provides the advantage, among other possibilities, of allowing the client 106 to promptly revert to and resume execution of the viewer application 163 from its state just prior to beginning execution of the target application 171.

The target application is executed within the execution of the viewer application so that the target application does not need to be installed as a stand-alone application on the device. The code of the target application is executed within the execution of the viewer application when, in block 618, the content viewer for the viewer application 163 initiates execution of the initial content of the target application 171. In some embodiments, executing the initial content comprises the content viewer executing and rendering the initial web content, including HTML and JavaScript/CSS, for the target application 171. Once execution of the target application 171 has begun, execution of this portion of the viewer application 163 (e.g. the user interface) ends as shown. Execution of the target application will proceed as though it had been installed through a traditional installation routine, which can include a full-screen user interface, access to sensors and other input devices, access to send/receive data through network interfaces and/or through local memory, as well as other possible resources. In some implementations, execution of the target application 171 will continue until such time as the execution is interrupted by user input (e.g. requesting via the UI of the target application 171 to exit the app) or by another function of the client 106 (e.g. the operating system terminating the execution of the target application). In other implementations, supplementary code 173 is added to the target application 171 that is responsive to input from a user requesting to, among other possible functions, revert to execution of the viewer application 163 from within the execution of the target application 171, as previously described.

FIG. 7 is a flow chart illustrating functionality for modifying code of a target application to include supplementary code for reverting back to the viewer application during execution of the target application, where the functionality is implemented as portions of a viewer application 163 executed in a client 106. The operation of the viewer application 163 described in FIG. 7 is executed in response to a user selecting a target application for evaluation in the viewer application 163 on the client device 106. In particular, the operations described relate to the addition of supplementary code for reverting to the viewer application 163 from within the execution of the target application 171. The application package for the target application 171 that is modified in the client 106 to include supplementary code can be resident in local storage on the client 106 or be retrieved from a server, such as a CMS, via a network. Beginning with block 703, the viewer application 163 obtains an application package for a target application 171. The application package can be in a ZIP, RAR, BZIP, APK, or other file packaging formats.

Then, in block 706, the viewer application 163 determines whether supplementary code 173 should be added to the target application 171 to support reverting to the viewer application 163 from within the executing target application 171. Such determination can be based on a selection within a user interface 164 of the viewer application 163, based on a user preference, and/or other possible sources. If the code to revert to the viewer app is not to be added to the code for the target application 171, execution of the viewer application 163 proceeds to block 715. Alternatively, if code to revert to the viewer app is to be added to the code for the target application 171, in block 709, the viewer application 163 determines a reference point in the viewer application 163 at which execution should return from the target application 171.

In embodiments where the viewer application 163 is built using web content, the reference point can be an identifier for a root HTML document that provides a user interface and other functionality for the viewer application. In other embodiments, the reference point is an address in memory of the client 106 or a link to a location in a file system for non-volatile storage on the client 106. Next, in block 712, the viewer application 163 modifies code of the target application 171 to include supplementary code for redirecting execution to the reference point of the viewer application 163. In some embodiments, the supplementary code is responsive to a unique gesture made by a user on a touch-sensitive display that, during execution of the target application 171, initiates reverting back to the viewer application 163. In other embodiments, the supplementary code provides a supplementary menu of actions to initiate from within the execution of the target application, one of the actions being reverting back to the viewer application 163.

Continuing, in block 715, the viewer application stores the code for the target application 171, including any supplementary code added, in the client 106. From this point, the code for the target application 171 can be made available by the viewer application 163 for evaluation by a user, either immediately or at a later time. Thereafter, this portion of the execution of the viewer application 163 ends as shown.

Figure 8:
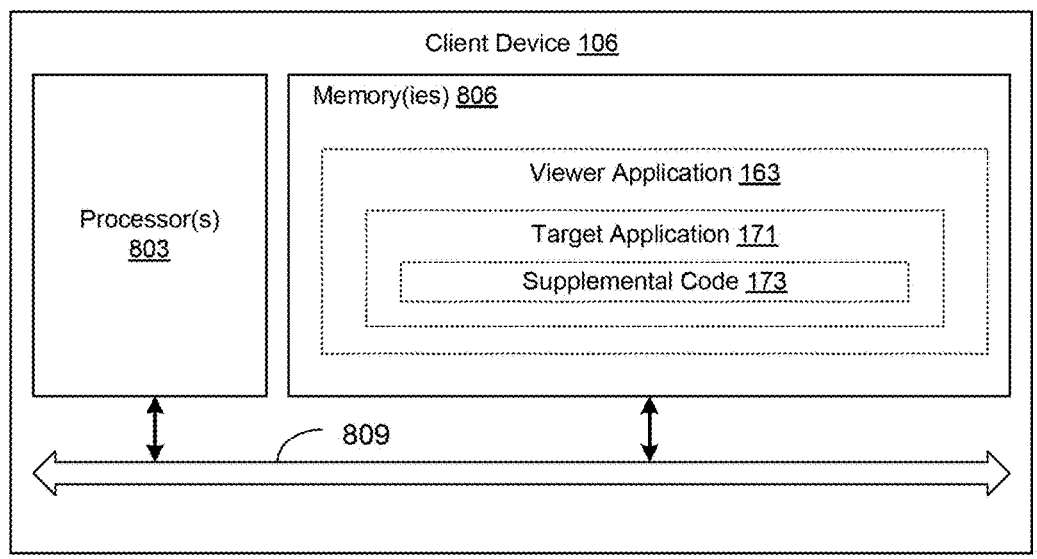
FIG. 8 is a schematic block diagram that provides one example illustration of a client employed in the networked environment of FIG. 1 according to various embodiments of the present disclosure.

With reference to FIG. 8, shown is a schematic block diagram of a client device 106 according to an embodiment of the present disclosure. Each client device 106 includes at least one processor circuit, for example, having a processor 803 and a memory 806, both of which are coupled to a local interface 809. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the viewer application 163, target application 171, supplemental code 173, and potentially other applications. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

The flowcharts of FIGS. 5-7 each show the functionality and operation of an implementation of portions of the viewer application 163. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc.

Although the flowcharts of FIGS. 5-7 each show a specific order of execution, it is understood that the order of execution may differ from that which is depicted. For example, the order of execution of two or more blocks may be scrambled relative to the order shown. Also, two or more blocks shown in succession in FIGS. 5-7 may be executed concurrently or with partial concurrence. Further, in some embodiments, one or more of the blocks shown in FIGS. 5-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the viewer application 163, target application 171, and supplemental code 173, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the viewer application 163, target application 171, and supplemental code 173, may be implemented and structured in a variety of ways. For example, one or more applications described may be implemented as modules or components of a single application. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method for evaluating an application under development through use of a viewer application executing in a mobile device, the method comprising:

retrieving, in the mobile device, an application package comprising code for a target application to be evaluated in the mobile device;

modifying the code for the target application in the mobile device to include a reference to code for retrieving, from within a user interface generated for the target application, a different version of the target application without reverting to the user interface of the viewer application;

storing the modified code for the target application in a memory of the mobile device accessible to the viewer application, the modified code for the target application stored without installing the target application as a stand-alone application on the mobile device;

in response to receiving input corresponding to a request to retrieve the different version of the target application:

retrieving, in the mobile device, the different version of the target application from a server;

storing the code for the different version of the target application in the memory of the mobile device accessible to the viewer application, the code for the different version of the target application stored without installing the different version of the target application as a stand-alone application on the mobile device; and executing the different version of the target application by executing the stored code of the different version of the target application from within the execution of the viewer application; and executing code of the viewer application to execute the stored code for the target application for evaluation, wherein executing the stored code of the target application executes the target application within the execution of the viewer application.

2. The method of claim 1, wherein the code for the target application is modified in the mobile device to include a reference to code for a user interface of the viewer application, wherein, during execution, the target application monitors for input corresponding to a request to return to the user interface of the viewer application.

3. The method of claim 2, wherein, in response to receiving the input corresponding to the request to return to the user interface of the viewer application, initiating execution of the code for the user interface of the viewer application identified by the reference.

4. The method of claim 2, wherein the input corresponding to the request to return to the user interface of the viewer application is a gesture applied to a touch-sensitive display.

5. The method of claim 1, further comprising generating, in the mobile device, a list of applications available for evaluation from a content management system (CMS), wherein said retrieving the application package occurs in response to receiving input selecting the target application from the list of applications.

6. The method of claim 1, wherein the code for the target application includes a network address for a server from which published updates to the target application can be obtained; and further comprising modifying the network address to identify a different server from which developmental updates to the target application can be obtained.

7. The method of claim 1, further comprising modifying the target application to include code for capturing a screenshot of the user interface generated for the target application.

8. The method of claim 7, wherein, in response to receiving input corresponding to a request to capture the screenshot of the user interface generated for the target application:

capturing the screenshot of the user interface generated for the target application; and transmitting the screenshot to a server.

9. A non-transitory computer-readable medium embodying a viewer application for evaluating an application under development, the viewer application executable in a mobile device, comprising code that:

retrieves an application package comprising code for a target application to be evaluated in the mobile device;

modifies the code for the target application in the mobile device to include a reference to code for retrieving, from within a user interface generated for the target application, a different version of the target application without reverting to the user interface of the viewer application;

stores the modified code for the target application in a memory of the mobile device accessible to the viewer application, the modified code for the target application stored without installing the target application as a stand-alone application on the mobile device;

in response to receiving input corresponding to a request to retrieve the different version of the target application:

retrieves the different version of the target application from a server;

stores the code for the different version of the target application in the memory of the mobile device accessible to the viewer application, the code for the different version of the target application stored without installing the different version of the target application as a stand-alone application on the mobile device; and executes the different version of the target application by executing the stored code of the different version of the target application from within the execution of the viewer application; and executes code of the viewer application to execute the stored code for the target application for evaluation, wherein executing the stored code of the target application executes the target application within the execution of the viewer application.

10. The non-transitory computer-readable medium of claim 9, wherein the viewer application further comprises code that modifies the code for the target application in the mobile device to include a reference to code for a user interface of the viewer application, wherein, during execution, the target application monitors for input corresponding to a request to return to the user interface of the viewer application.

11. A system for evaluating an application under development through use of a viewer application, the system comprising:

a mobile device comprising a processor and a memory; and the viewer application executed in the mobile device, the viewer application comprising logic that:

retrieves an application package comprising code for a target application to be evaluated in the mobile device;

modifies the code for the target application in the mobile device to include a reference to code for retrieving, from within a user interface generated for the target application, a different version of the target application without reverting to the user interface of the viewer application;

stores the modified code for the target application in the memory accessible to the viewer application, the modified code for the target application stored without installing the target application as a stand-alone application on the mobile device;

in response to receiving input corresponding to a request to retrieve the different version of the target application:

retrieves the different version of the target application from a server;

stores the code for the different version of the target application in the memory of the mobile device accessible to the viewer application, the code for the different version of the target application stored without installing the different version of the target application as a stand-alone application on the mobile device; and executes the different version of the target application by executing the stored code of the different version of the target application from within the execution of the viewer application; and executes code of the viewer application to execute the stored code for the target application for evaluation, wherein executing the stored code of the target application executes the target application within the execution of the viewer application.

12. The system of claim 11, wherein the viewer application further comprises logic that modifies the code for the target application in the mobile device to include a reference to code for a user interface of the viewer application, wherein, during execution, the target application monitors for input corresponding to a request to return to the user interface of the viewer application.

13. The system of claim 12, wherein the input corresponding to the request to return to the user interface of the viewer application is a gesture applied to a touch-sensitive display.

14. The system of claim 11, wherein the code for the target application includes a network address for a server from which published updates to the target application can be obtained; and the viewer application further comprises logic that modifies the network address to identify a different server from which developmental updates to the target application can be obtained.

15. The system of claim 11, wherein the viewer application further comprises logic that modifies the target application to include code for capturing a screenshot of the user interface generated for the target application.

16. The system of claim 11, wherein the viewer application further comprises logic that generates a list of applications available for evaluation in a content management system (CMS), wherein said retrieving the application package occurs in response to receiving input selecting the target application from the list of applications.

17. The system of claim 16, wherein retrieving another a different version of the target application further comprises retrieving an updated version of the target application from the CMS.

\* \* \* \* \*